(No Model.)
J. B. TAPLIN.
OUTSIDE FRICTION BAND CLUTCH.
No. 489,045. Patented Jan. 3, 1893.
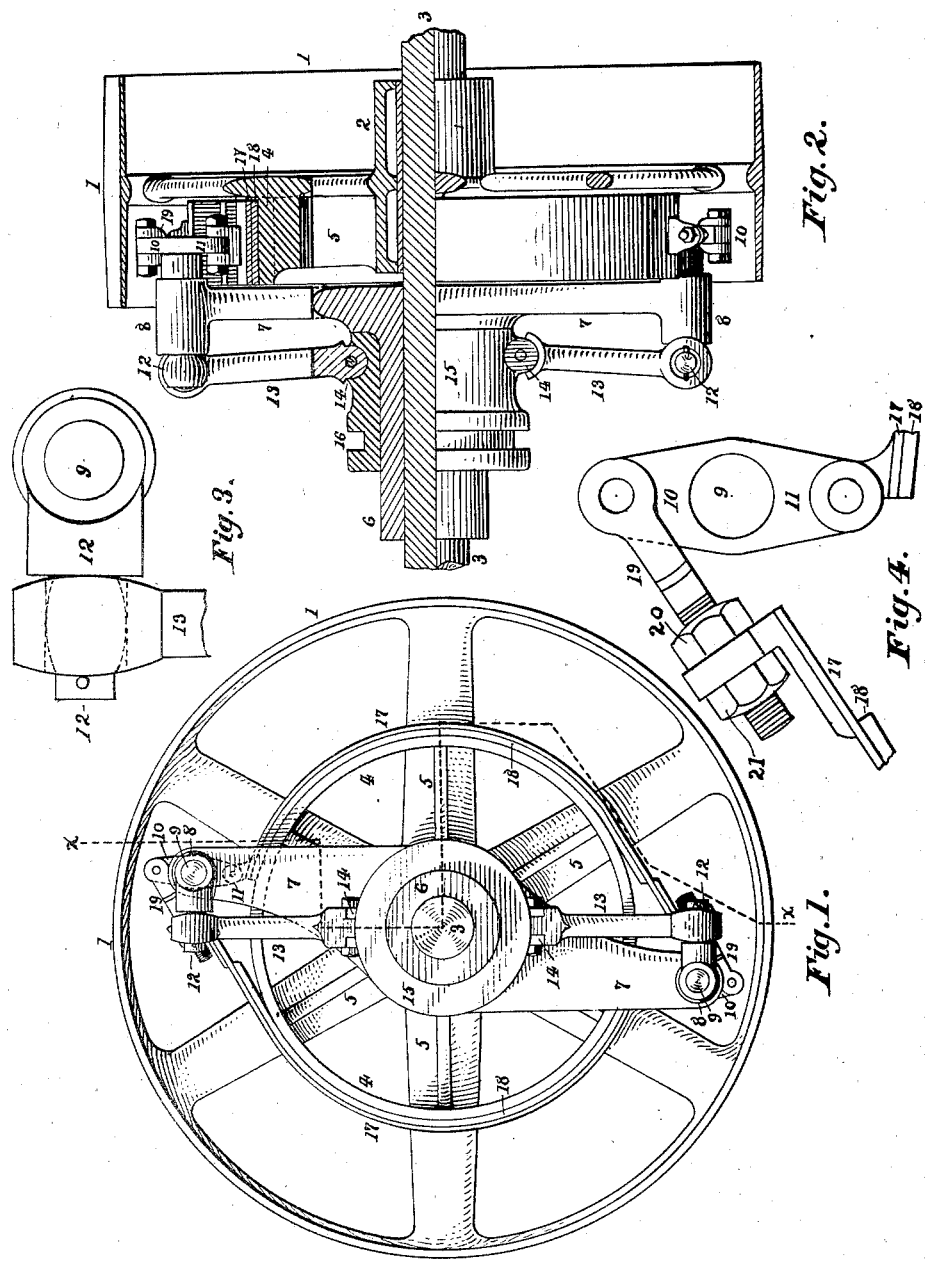
Witnesses
Inventor
James B. Taplin:
By his Attorney

UNITED STATES PATENT OFFICE.

JAMES B TAPLIN, OF AKRON, OHIO.

OUTSIDE FRICTION-BAND CLUTCH.

SPECIFICATION forming part of Letters Patent No. 489,045, dated January 3, 1893.

Application filed May 26, 1892. Serial No. 434,411. (No model.)

*To all whom it may concern:*

Be it known that I, JAMES B. TAPLIN, a citizen of the United States, residing at Akron, in the county of Summit and State of Ohio, have invented a certain new and useful Improvement in Outside Friction-Band Clutches, of which the following is a specification.

My invention has relation to improvements in that class of friction band clutches in which the friction band is connected with a driver keyed to the main shaft, and is, by means of suitable mechanism, caused to contract against the outside of an annular rim connected with a hub loosely mounted on the shaft.

The object of my invention is to produce an improved clutch that can be quickly operated; have great frictional resistance between the band and rim; increased motion of the band to and from the rim; complete separation of the band and rim when disengaged; and generally to simplify the construction, reduce the number of parts, and facilitate the removal and replacement of parts in case of needed repairs.

To the aforesaid object, my invention consists in the peculiar and novel arrangement, construction and combination of parts hereinafter described and then specifically pointed out in the claims, reference being had to the accompanying drawings which form a part of this specification.

In the accompanying drawings, in which similar reference numerals indicate like parts, Figure 1, is an elevation of my improved clutch; Fig. 2, a section of the same at the line x, x; and Figs. 3 and 4, enlarged details of parts of the mechanism hereinafter described.

Referring to the drawings, 1 is a pulley, the hub 2, of which is loosely mounted on the shaft 3, and attached to the spokes of which is an annular rim 4, concentric with the pulley and internally braced by webs 5.

Mounted on and fastened to the shaft 3, by a key, set screw, or other preferred device, is a hub 6, from opposite sides of which extend radial arms 7, similar in construction, each bearing at its outer end a journal bearing 8, parallel with the main shaft 3; said hub and radial arms being hereinafter, for convenience, termed the driver. Journaled in each bearing 8, is a rock shaft 9, bearing at one end two similar, opposite, crank-arms 10, 11, and at the opposite end a crank-arm 12; see enlarged views 3 and 4. The outer end of each crank-arm 12, terminates in an ellipsoidal wrist that fits in a straight hole in one end of links 13; see Fig. 3; the opposite ends of which links are hinged between ears 14, on opposite sides of the sleeve 15, which slides on the hub 6, and has an annular groove 16, to receive a fork by which it may be shifted.

Surrounding opposite halves of the face of the rim 4, are two segmental metallic bands 17, lined with a frictional lagging 18, as leather or other approved material; one end of each band being hinged to one of the inner crank-arms 11; the other ends being respectively hinged to the opposite crank-arms 10, by hinged bolts 19, provided with nuts 20, 21, by which their relation to the rim and to each other may be adjusted.

In operation, by sliding the sleeve 15, toward the pulley 1, as shown in Figs. 1, and 2, the shafts 9, will be rocked, and the opposite ends of each band 17, simultaneously drawn toward each other, compressing the bands on the rim, and causing the pulley to revolve with the shaft, and by sliding the sleeve in the opposite direction the bands will be released; and being forced outward from each end will by their resistance stand free from contact with the rim.

I claim:

1. In a clutch of the class designated, a main driving shaft; and a hub loosely mounted on said shaft and supporting an annular rim adapted to communicate motion to the machinery to be driven; and a driver consisting of a hub attached to said driving shaft, having oppositely-disposed radial arms; combined with segmental bands, surrounding and arranged to clamp opposite halves of said annular rim, and mechanism mounted in the opposite ends of said driver connected with, and arranged to simultaneously draw or separate, the adjacent ends of said opposite bands, substantially as shown and described.

2. In a clutch of the class designated, a main driving shaft; and an annular rim supported by a hub loosely mounted on said shaft, and arranged to communicate motion to the machinery to be driven; and a driver consisting of a hub having oppositely-disposed radial arms; and two semi-circular bands surrounding and arranged to clamp opposite sides of said rim, combined with rock-shafts journaled in the radial arms of said driver, each having oppositely-disposed crank-arms, respectively connected with the adjacent ends of said semi-circular bands, and means for rocking said shafts, and drawing together and forcing apart said adjacent ends, substantially as set forth.

3. In a clutch of the class designated, the combination of the driving shaft; the annular rim supported by a hub loosely mounted on said driving shaft; the driver fixed to, and arranged to revolve with said shaft; the rock-shafts journaled in the ends of said driver, each having oppositely-disposed crank-arms severally connected with the adjacent ends of semi-circular bands surrounding opposite sides of said rim; the semi-circular bands; the third crank-arms; the sliding collar and the links connecting said third crank-arms and sliding collar, substantially as shown and described.

In testimony that I claim the above I hereunto set my hand.

JAMES B. TAPLIN.

Witnesses:
  C. P. HUMPHREY,
  C. E. HUMPHREY.